(12) United States Patent
Tour et al.

(10) Patent No.: US 11,984,576 B1
(45) Date of Patent: May 14, 2024

(54) ALKALI-METAL ANODE WITH ALLOY COATING APPLIED BY FRICTION

(71) Applicant: William Marsh Rice University, Houston, TX (US)

(72) Inventors: James M. Tour, Bellaire, TX (US); Rodrigo Villegas Salvatierra, Houston, TX (US); Duy Xuan Luong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 631 days.

(21) Appl. No.: 17/061,223

(22) Filed: Oct. 1, 2020

Related U.S. Application Data

(60) Provisional application No. 62/909,062, filed on Oct. 1, 2019.

(51) Int. Cl.
| | |
|---|---|
| *H01M 4/04* | (2006.01) |
| *H01M 4/134* | (2010.01) |
| *H01M 4/1395* | (2010.01) |
| *H01M 4/36* | (2006.01) |
| *H01M 4/38* | (2006.01) |
| *H01M 4/62* | (2006.01) |

(Continued)

(52) U.S. Cl.
CPC ......... *H01M 4/0402* (2013.01); *H01M 4/043* (2013.01); *H01M 4/134* (2013.01); *H01M 4/1395* (2013.01); *H01M 4/366* (2013.01); *H01M 4/382* (2013.01); *H01M 4/628* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 4,416,960 | A | 11/1983 | Eustace et al. |
| 5,426,006 | A | 6/1995 | Delnick et al. |

(Continued)

FOREIGN PATENT DOCUMENTS

| | | |
|---|---|---|
| CN | 102368561 A | 3/2012 |
| CN | 102906177 A | 1/2013 |

(Continued)

OTHER PUBLICATIONS

Decision of the Intellectual Property Office, Reasons for the Rejection for Taiwan Patent Application No. 106129755; dated Oct. 5, 2022; 2 pages.

(Continued)

*Primary Examiner* — Tracy M Dove
(74) *Attorney, Agent, or Firm* — Dickinson Wright PLLC; Ross Spencer Garsson

(57) ABSTRACT

An electrochemical cell with a lithium-metal anode that suppresses dendrite formation and can be fabricated using a simple, inexpensive, and solvent-free process. The anode is coated with a layer of disordered nanomaterial, saturated with lithium ions, that suppresses dendrite formation during charging. The dendrite-suppression coating can be applied simply using a dry, abrasive technique in which the lithium-metal anode is alternately abraded to roughen the surface and polished using a polishing powder of a material that alloys with the lithium.

18 Claims, 8 Drawing Sheets

(51) Int. Cl.
  *H01M 10/052* (2010.01)
  *H01M 4/02* (2006.01)

(56) References Cited

U.S. PATENT DOCUMENTS

| | | | |
|---|---|---|---|
| 6,326,104 B1 | 12/2001 | Caja et al. | |
| 6,576,370 B1 | 6/2003 | Nakagiri et al. | |
| 7,070,632 B1* | 7/2006 | Visco | H01M 4/5815 |
| | | | 429/231.95 |
| 8,665,581 B2 | 3/2014 | Fleischer et al. | |
| 8,709,373 B2 | 4/2014 | Hauge et al. | |
| 9,096,437 B2 | 8/2015 | Tour et al. | |
| 9,455,094 B2 | 9/2016 | Tour et al. | |
| 9,882,241 B2 | 1/2018 | Singh et al. | |
| 9,923,234 B2 | 3/2018 | Eitouni et al. | |
| 10,044,064 B2 | 8/2018 | Eitouni et al. | |
| 10,056,618 B2 | 8/2018 | Li et al. | |
| 10,153,514 B2 | 12/2018 | Pratt et al. | |
| 2003/0113624 A1 | 6/2003 | Kim et al. | |
| 2003/0118908 A1 | 6/2003 | Ishikawa et al. | |
| 2009/0053594 A1 | 2/2009 | Johnson et al. | |
| 2011/0165462 A1 | 7/2011 | Zhamu et al. | |
| 2011/0183206 A1 | 7/2011 | Davis et al. | |
| 2011/0262807 A1 | 10/2011 | Boren et al. | |
| 2011/0318654 A1 | 12/2011 | Janssen | |
| 2012/0077084 A1 | 3/2012 | Christensen et al. | |
| 2012/0171574 A1 | 7/2012 | Zhamu et al. | |
| 2012/0231326 A1 | 9/2012 | Biswal et al. | |
| 2013/0065050 A1 | 3/2013 | Chen et al. | |
| 2013/0157128 A1 | 6/2013 | Solan et al. | |
| 2013/0164626 A1 | 6/2013 | Manthiram et al. | |
| 2013/0171502 A1 | 7/2013 | Chen et al. | |
| 2013/0183547 A1 | 7/2013 | Kourtakis et al. | |
| 2013/0196235 A1 | 8/2013 | Prieto et al. | |
| 2013/0202961 A1 | 8/2013 | Hagen et al. | |
| 2013/0220817 A1 | 8/2013 | Walker et al. | |
| 2013/0224594 A1 | 8/2013 | Yushin et al. | |
| 2013/0244097 A1 | 9/2013 | Leitner et al. | |
| 2013/0260246 A1 | 10/2013 | Chen et al. | |
| 2014/0014030 A1 | 1/2014 | Tour et al. | |
| 2014/0147738 A1 | 5/2014 | Chen et al. | |
| 2014/0178688 A1 | 6/2014 | Tour et al. | |
| 2014/0313636 A1 | 10/2014 | Tour et al. | |
| 2014/0332731 A1 | 11/2014 | Ma et al. | |
| 2015/0010788 A1 | 1/2015 | Aria et al. | |
| 2015/0155549 A1 | 6/2015 | Moganty et al. | |
| 2015/0236372 A1 | 8/2015 | Yushin et al. | |
| 2016/0240840 A1 | 8/2016 | He et al. | |
| 2017/0194636 A1 | 7/2017 | Osada et al. | |
| 2017/0352909 A1 | 12/2017 | Ainsworth et al. | |
| 2018/0175379 A1 | 6/2018 | Tour et al. | |
| 2018/0183041 A1 | 6/2018 | Tour et al. | |
| 2018/0233784 A1 | 8/2018 | Zhamu et al. | |
| 2018/0287121 A1 | 10/2018 | Kim et al. | |
| 2018/0287162 A1 | 10/2018 | Tour et al. | |
| 2019/0181425 A1 | 6/2019 | Tour et al. | |
| 2021/0126246 A1* | 4/2021 | Gazda | H01M 4/587 |

FOREIGN PATENT DOCUMENTS

| | | |
|---|---|---|
| CN | 103515646 A | 1/2014 |
| CN | 104362394 A | 2/2015 |
| CN | 105350054 A | 2/2016 |
| CN | 105789563 A | 7/2016 |
| JP | 2005294028 A | 10/2005 |
| WO | 2013001693 A1 | 1/2013 |
| WO | 2015084945 A1 | 6/2015 |
| WO | 2016201101 A1 | 12/2016 |
| WO | 2017011052 A2 | 1/2017 |
| WO | 2017034650 A2 | 3/2017 |
| WO | 2017062950 A1 | 4/2017 |
| WO | 2017120391 A1 | 7/2017 |
| WO | 2017164963 A2 | 9/2017 |
| WO | 2018045226 A1 | 3/2018 |

OTHER PUBLICATIONS

Duong et al. "Dry Electrode Coating Technology" Maxwell Technologies, Inc., 4 pages.

Armand, M. et al. "Building Better Batteries", Nature 2008, 451 (7179), 652-657 ("Armand 2008"), 6 pages.

Aurbach, D. et al. "A Short Review of Failure Mechanisms of Lithium Metal and Lithiated Graphite Anodes in Liquid Electrolyte Solutions" Solid State Ionics 2002, 148, 405-416 ("Aurbach 2002"), 12 pages.

Bai, P. et al. "Transition of Lithium Growth Mechanisms in Liquid Electrolytes" Energy Environ. Sci. 2016, 9, 3221-3229 ("Bai 2016"), 9 pages.

Basile, A. et al. "Stabilizing Lithium Metal Using Ionic Liquids for Long-Lived Batteries". Nature Comm. 2016, 7, 11794, 11 pages.

Bates, J. et al. "Fabrication and Characterization of Amorphous Lithium Electrolyte Thin Films and Rechargeable Thin-Film Batteries". J. Power Sources 1993, 43 (1-3), 103-110 ("Bates 1993"), 8 pages.

Bates, J. et al. "Thin-film Lithium and Lithium-Ion Batteries", Solid State Ionics 2000, 135, 33-45; 13 pages.

Besenhard, J. et al. "Inorganic Film-Forming Electrolyte Additives Improving the Cycling Behaviour of Metallic Lithium Electrodes and the Self-Discharge of Carbon-Lithium Electrodes". J. Power Sources 1993, 44 (1-3), 413-420 ("Besenhard 1993"), 8 pages.

Bouchet, R. "Batteries: A Stable Lithium Metal Interface". Nat. Nanotechnol. 2014, 9, 572-573 ("Bouchet 2014"), 2 pages.

Bouchet, R. et al. "Single-Ion BAB Triblock Copolymers as Highly Efficient Electrolytes for Lithium-Metal Batteries", Nature Mater. 2013, 12, 452; 6 pages.

Bruce, P. et al. "Li—O2 and Li—S Batteries with High Energy Storage", Nat. Mater. 2011, 11 (2), 172-172 ("Bruce 2011"). 12 pages.

Cavallo, C. et al. "A free-standing reduced graphene oxide aerogel as supporting electrode in a fluorine-free Li2S8 catholyte Li—S battery," Journal of Power Sources, Feb. 5, 2019, 7 pages.

Chebiam, R. et al. "Comparison of the chemical stability of the high energy density cathodes of lithium-ion batteries," Electrochemistry Communications 2001, 3 (11), 624-627. 4 pages.

Cheon, S. et al. "Rechargeable Lithium Sulfur Battery: II. Rate Capability and Cycle Characteristics," Journal of The Electrochemical Society 2003, 150 (6), A800-A805, 7 pages.

Claye, A. et al. "Solid-State Electrochemistry of the Li Single Wall Carbon Nanotube System". J. Electrochem. Soc. 2000, 147, 2845-2852 ("Claye 2000"), 9 pages.

Cohen, Y. et al. "Micromorphological Studies of Lithium Electrodes in Alkyl Carbonate Solutions Using in Situ Atomic Force Microscopy". J. Phys. Chem. B 2000, 104 (51), 12282-12291 ("Cohen 2000"), 10 pages.

Crowther, O. et al. "Effect of Electrolyte Composition on Lithium Dendrite Growth", J. Electrochem. Soc. 2008, 155, A806-A811 ("Crowther 2008"), 7 pages.

Ding, F. et al. "Dendrite-Free Lithium Deposition via Self-Healing Electrostatic Shield Mechanism", J. Am. Chem. Soc. 2013, 135 (11), 4450-4456 ("Ding II 2013"), 7 pages.

Ding, F. et al. "Effects of Carbonate Solvents and Lithium Salts on Morphology and Coulombic Efficiency of Lithium Electrode". J. Electrochem. Soc. 2013, 160 (10), A1894-A1901 ("Ding I 2013"), 9 pages.

Dresselhaus, M. et al. "Raman Spectroscopy on Isolated Single Wall Carbon Nanotubes". Carbon 2002, 40, 2043-2061 ("Dresselhaus 2002"), 19 pages.

Dunn, B. et al. "Electrical Energy Storage for the Grid: A Battery of Choices". Science (80). 2011, 334 (6058), 928-935 ("Dunn 2011"), 9 pages.

Ebbesen, T. et al. "Electrical Conductivity of Individual Carbon Nanotubes". Nature 1996, 382, 54-56 ("Ebbesen 1996"), 3 pages.

Evarts, E. "Lithium Batteries: To the Limits of Lithium". Nature 2015, 526, S93-S95 ("Evarts 2015") 4 pages.

Girishkumar, G. et al. "Lithium-Air Battery: Promise and Challenges". J. Phys. Chem. Lett. 2010, 1 (14), 2193-2203 ("Girishkumar 2010"); 11 pages.

(56) References Cited

OTHER PUBLICATIONS

Goodenough, J. et al., "The Li-Ion Rechargeable Battery: A Perspective". J. Am. Chem. Soc. 2013, 135 (4), 1167-1176 ("Goodenough 2013") 10 pages.
Hao, X. et al., "Ultrastrong Polyoxyzole Nanofiber Membranes for Dendrite-Proof and Heat-Resistant Battery Separators". Nano Lett. 2016, 16, 2981-2987 ("Hao 2016"), 7 pages.
Hirai, T. et al. "Effect of Additives on Lithium Cycling Efficiency". J. Electrochem. Soc. 1994, 141, 2300-2305 ("Hirai 1994"), 7 pages.
Holstiege, F. et al. "Pre-Lithiation Strategies for Rechargeable Energy Storage Technologies: Concepts, Promises and Challenges," Batteries, Jan. 23, 2018, 39 pages.
Hou, J. et al."Graphene-based electrochemical energy conversion and storage: fuel cells, supercapacitors and lithium on batteries", Physical Chemistry Chemical Physics, vol. 13, No. 34, Jan. 1, 2011, pp. 15384-15402.; 19 pages.
Hutchins, M. "New chemistry promises better lithium sulfur batteries," PV Magazine, Jun. 22, 2020, 5 pages.
Ji, X. et al. "Advances in Li—S batteries," Journal of Materials Chemistry 2010, 20 (44), 9821-9826; 6 pages.
Jin, S. et al. "Covalently Connected Carbon Nanostructures for Current Collectors in Both the Cathode and Anode of Li—S Batteries". Adv. Mater. 2016, 28, 9094-9102 ("Jin 2016"), 9 pages.
Jin, S. et al. "Efficient Activation of High-Loading Sulfur by Small CNTs Confined Inside a Large CNT for High-Capacity and High-Rate Lithium-Sulfur Batteries". Nano Lett. 2015, acs.nanolett. 5b04105 ("Jin 2015"), 8 pages.
Kamaya, N. et al. "A Lithium Superionic Conductor", Nature Mater. 2011, 10, 682; 5 pages.
Kang, N. et al. "Cathode porosity is a missing key parameter to optimize lithium-sulfur battery energy density," Nature Communications, Oct. 10, 2019, 10 pages.
Kanno, R. et al. "Lithium Ionic Conductor Thio-LISICON: the Li2SGeS2P2S5 System", J. Electrochem. Soc. 2001, 148, A742. 6 pages.
Kim, J. et al. "Controlled Lithium Dendrite Growth by a Synergistic Effect of Multilayered Graphene Coating and an Electrolyte Additive", Chem. Mater. 2015, 27 (8), 2780-2787 ("Kim 2015"), 8 pages.
Kim, M. et al. "A fast and efficient pre-doping approach to high energy density lithium-ion hybrid capacitors," Journal of Materials Chemistry A of The Royal Society of Chemistry, Mar. 2014, 6 pages (10029-10033); 6 pages.
Kozen, A. et al. "Next-Generation Lithium Metal Anode Engineering via Atomic Layer Deposition", ACS Nano 2015, 9 (6), 5884-5892 ("Kozen 2015"), 9 pages.
Landi, B. et al. "Carbon Nanotubes for Lithium Ion Batteries". Energy Environ. Sci. 2009, 2, 638-654 ("Landi 2009"), 18 pages.
Landi, B. et al. "Lithium Ion Capacity of Single Wall Carbon Nanotube Paper Electrodes", J. Phys. Chem. C 2008, 112, 7509-7515 ("Landi 2008"); 7 pages.
Lee, H. et al. "Simple Composite Protective Layer Coating that Enhances the Cycling Stability of Lithium Metal Batteries", J. Power Sources 2015, 284, 103-108 ("Lee 2015"); 6 pages.
Li, F. et al. "Identification of the Constituents of Double-Walled Carbon Nanotubes Using Raman Spectra Taken with Different Laser-Excitation Energies". J. Mater. Res. 2003, 18, 1251-1258 ("Li 2003"), 9 pages.
Li, N. et al. "An Artificial Solid Electrolyte Interphase Layer for Stable Lithium Metal Anodes". Adv. Mater. 2016, 28 (9), 1853-1858 ("Li 2016"), 7 pages.
Li, W. et al. "The Synergetic Effect of Lithium Polysulfide and Lithium Nitrate to Prevent Lithium Dendrite Growth". Nat. Commun. 2015, 6 (May), 7436 ("Li 2015"), 8 pages.
Liang, Z. et al. "Composite Lithium Metal Anode by Melt Infusion of Lithium into a 3D Conducting Scaffold with Lithiophilic Coating". Proc. Natl. Acad. Sci. U. S. A. 2016, 113, 2862-2867 ("Liang 2016"), 6 pages.

Lin, D. et al. "Layered Reduced Graphene Oxide with Nanoscale Interlayer Gaps as a Stable Host for Lithium Metal Anodes", Nat. Nanotechnol. 2016, 11, 626-632 ("Lin 2016"); 8 pages.
Lin, D. et al. "Reviving the Lithium Metal Anode for High-Energy Batteries", Nat. Publ. Gr. 2017, 12 (3), 194-206 ("Lin I 2017"); 13 pages.
Lin, D. et al. "Three-Dimensional Stable Lithium Metal Anode with Nanoscale Lithium Islands Embedded in Ionically Conductive Solid Matrix". Proc. Natl. Acad. Sci. U. S. A. 2017, 114, 4613-4618 ("Lin II 2017"), 6 pages.
Lin, J. et al. "3-Dimensional Graphene Carbon Nanotube Carpet-Based Microsupercapacitors with High Electrochemical Performance", Nano Lett. 2013, 13, 72-78 ("Lin 2015"); 7 pages.
Liu, Y. et al. "An Artificial Solid Electrolyte Interphase with High Li-Ion Conductivity, Mechanical Strength, and Flexibility for Stable Lithium Metal Anodes". Adv. Mater. 2017, 29, 1605531 ("Liu 2017"), 8 pages.
Liu, Y. et al. "Lithium-Coated Polymeric Matrix as a Minimum vol. Change and Dendrite-Free Lithium Metal Anode", Nat. Commun. 2016, 7, 10992 ("Liu 2016"), 9 pages.
Lu, L. et al. "Free-Standing Copper Nanowire Network Current Collector for Improving Lithium Anode Performance", Nano Lett. 2016, 16, 4431; 7 pages.
Lu, Y. et al. "Stable Lithium Electrodeposition in Liquid and Nanoporous Solid Electrolytes". Nat. Mater. 2014, 13, 961-969 ("Lu 2014"); 9 pages.
Luo, C. et al. "A chemically stabilized sulfur cathode for lean electrolyte lithium sulfur batteries," Proceedings of the National Academy of Sciences (PNAS.org), May 15, 2020, 9 pages.
Mahmood, N. et al. "Nanostructured Anode Materials for Lithium Ion Batteries: Progress, Challenge and Perspective". Adv. Energy Mater. 2016, 6, 1600374 ("Mahmood 2016"), 22 pages.
Manthiram, A. et al. "Lithium-Sulfur Batteries: Progress and Prospects". Adv. Mater. 2015, 27 (12), 1980-2006 ("Manthiram 2015"), 27 pages.
Mikhaylik, Y. et al. "Polysulfide Shuttle Study in the Li/S Battery System," Journal of The Electrochemical Society 2004, 151 (11), A1969-A1976, 9 pages.
Murugan, R. et al. "Fast Lithium Ion Conduction in Garnet-Type Li7La3Zr2O12". Angew. Chem. Int. Ed. 2007, 46, 7778, 4 pages.
Noorden, R. "The Rechargeable Revolution: A Better Battery". Nature 2014, 507, 26-28 ("Noorden 2014"), 3 pages.
Osaka, T. et al. "Surface Characterization of Electrodeposited Lithium Anode with Enhanced Cycleability Obtained by CO2 Addition", J. Electrochem. Soc. 1997, 144 (5), 1709 ("Osaka 1997"), 6 pages.
Peigney, A. et al. "Specific Surface Area of Carbon Nanotubes and Bundles of Carbon Nanotubes". Carbon 2001, 39, 507-514 ("Peigney 2001"), 9 pages.
Qian, J. et al. "High Rate and Stable Cycling of Lithium Metal Anode". Nat. Commun. 2015, 6, 6362 ("Qian 2015"), 9 pages.
Ren, Z. et al. "Synthesis of Large Arrays of Well-Aligned Carbon Nanotubes on Glass". Science 1998, 282, 1105-1107 ("Ren 1998"), 4 pages.
Roy, P. et al. "Nanostructured Anode Materials for Lithium Ion Batteries". J. Mater. Chem. A 2015, 3, 2454-2484 ("Roy 2015"), 31 pages.
Salvatierra, R. et al. "Graphene Carbon Nanotube Carpets Grown Using Binary Catalysts for High-Performance Lithium-Ion Capacitors". ACS Nano 2017, 11, 2724-2733 ("Salvatierra 2017"), 10 pages.
Stone, G. et al. "Resolution of the Modulus Versus Adhesion Dilemma in Solid Polymer Electrolytes for Rechargeable Lithium Metal Batteries", J. Electrochem. Soc. 2012, 159, A222, 7 pages.
Su, Y. et al. "Lithium-sulfur batteries with a microporous carbon paper as a bifunctional interlayer," Nature Communications 2012, 3, 1166, 6 pages.
Sun, Z. et al. "Large-Area Bernal-Stacked Bi-, Tri-, and Tetralayer Graphene". ACS Nano 2012, 6, 9790-9796 ("Sun 2012"), 7 pages.
Thess, A. et al. "Crystalline Ropes of Metallic Carbon Nanotubes", Science 1996, 273, 483-487 ("Thess 1996"), 6 pages.

(56) References Cited

OTHER PUBLICATIONS

Tung, S. et al. "A Dendrite-Suppressing Composite Ion Conductor from Aramid Nanofibres". Nat. Commun. 2015, 6, 6152 ("Tung 2015"), 7 pages.
Wang, C. et al. "Suppression of Lithium-Dendrite Formation by Using LAGP-PEO (LiTFSI) Composite Solid Electrolyte and Lithium Metal Anode Modified by PEO (LiTFSI) in All-Solid-State Lithium Batteries", ACS Appl. Mater. Interfaces 2017, acsami.7b00336 ("Wang 2017"); 9 pages.
Wei, S. et al. "Metal-Sulfur Battery Cathodes Based on Pan-Sulfur Composites", J. Am. Chem. Soc. 2015, 137, 12143-12152 ("Wei 2015"); 10 pages.
Whittingham, M. "History, Evolution, and Future Status of Energy Storage". Proc. IEEE 2012, 100 (Special Centennial Issue), 1518-1534 ("Whittingham 2012"), 17 pages.
Wikipedia "Lithium-sulfur battery," Retrieved from https://en.wikipedia.org/w/index.php?title=Lithium-sulfur_battery&oldid=963354052, last edited on Jun. 19, 2020, at 10:29 (UTC), 9 pages.
Xu, W. et al. "Lithium Metal Anodes for Rechargeable Batteries", Energy Environ. Sci. 2014, 7 (2), 513-537 ("Xu 2014"); 25 pages.
Yan, K. et al. "Selective Deposition and Stable Encapsulation of Lithium through Heterogeneous Seeded Growth", Nat. Energy 2016, 1, 16010 ("Yan 2016"); 8 pages.
Yan, Z. et al. "Three-Dimensional Metal Graphene Nanotube Multifunctional Hybrid Materials," ACS Nano 2013, 7, 58-64. DOI: 10.1021/nn3015882; 7 pages.
Yang, C. et al. "Accommodating Lithium into 3D Current Collectors with a Submicron Skeleton Towards Long-Life Lithium Metal Anodes". Nat. Commun. 2015, 6, 8058 ("Yang 2015"), 9 pages.
Yang, Y. et al. "Nanostructures sulfur cathodes," Chem Soc Rev of The Royal Society of Chemistry, Jul. 2012 (3018-3032); 15 pages.
Yazami, R. et al. "A Reversible Graphite-Lithium Negative Electrode for Electrochemical Generators", J. Power Sources 1983, 9, 365-371 ("Yazami 1983"); 7 pages.
Zhang, H. et al. "Three-Dimensional Bicontinuous Ultrafast-Charge and -Discharge Bulk Battery Electrodes", Nat. Nanotechnol. 2011, 6, 277-281 ("Zhang 2011"); 5 pages.
Zhang, J. et al. "Lithium Metal Anodes and Rechargeable Lithium Metal Batteries", 1st ed.; Hull, R. et al., Eds.; Springer International Publishing, 2017 ("J. Zhang 2017"); 206 pages.
Zhang, R. et al. "Conductive Nanostructured Scaffolds Render Low Local Current Density to Inhibit Lithium Dendrite Growth". Adv. Mater. 2016, 28, 2155-2162 ("Zhang 2016"), 8 pages.
Zhang, S. "Sulfurized carbon: a class of cathode materials for high performance lithium/sulfur batteries," Frontiers in Energy Research, Dec. 2013, 10 pages.
Zhang, S. et al. "Charge and Discharge Characteristics of a Commercial LiCoO2-Based 18650 Li-Ion Battery", J. Power Sources 2006, 160, 1403-1409 ("Zhang 2006"); 7 pages.
Zhang, Y. et al. "A Carbon-Based 3d Current Collector with Surface Protection for Li Metal Anode", Nano Res. 2017, 10, 1356-1365 ("Y. Zhang II 2017"); 11 pages.
Zhang, Y. et al. "High-Capacity, Low-Tortuosity, and Channel-Guided Lithium Metal Anode". Proc. Natl. Acad. Sci. U. S. A. 2017, 114, 3584-3589 ("Y. Zhang I 2017"), 6 pages.
Zheng, G. et al. "Interconnected Hollow Carbon Nanospheres for Stable Lithium Metal Anodes", Nat. Nanotechnol. 2014, advance on (8), 618-623 ("Zheng 2014"); 6 pages.
Zhou, W. et al. "Plating a Dendrite-Free Lithium Anode with a Polymer/Ceramic/Polymer Sandwich Electrolyte", J. Am. Chem. Soc. 2016, 138 (30), 9385-9388 ("Zhou 2016"); 4 pages.
Zhu, Y. et al. "A seamless three-dimensional carbon nanotube graphene hybrid material," Nature Communications 2012, 3, 1225, 7 pages.
European Patent Office, European Search Report for Application No. EP16854534.1, dated May 9, 2019, 9 pages.
International Searching Authority, International Preliminary Report on Patentability for PCT/ US2016/056270, dated Apr. 10, 2018, 9 pages.
International Searching Authority, International Search Report and Written Opinion for PCT/US2016/056270, dated Dec. 22, 2016, 11 pages.
Officer Maruska Galaliolo; International Search Report and Written Opinion; PCT/US2017/049719; dated Oct. 20, 2017; 13 pages.
Examination Report and Search Report from the Taiwan Intellectual Property Office (TIPO) for Patent Application No. 106 129755, dated Oct. 28, 2021; 11 pages.
China National Intellectual Property Administration, Notice on the First Office Action for CN Application No. 201780067483.9; dated May 24, 2021; 13 pages.

\* cited by examiner

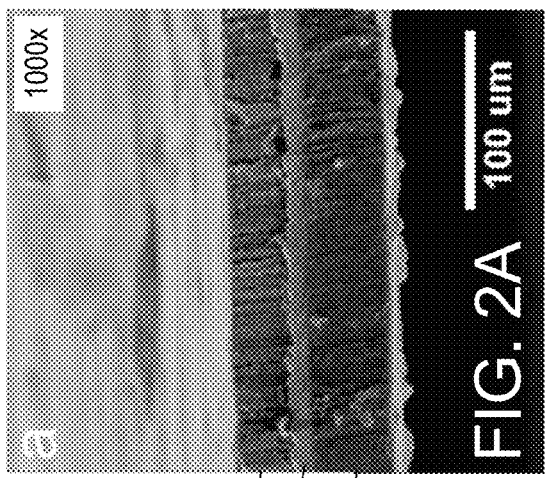
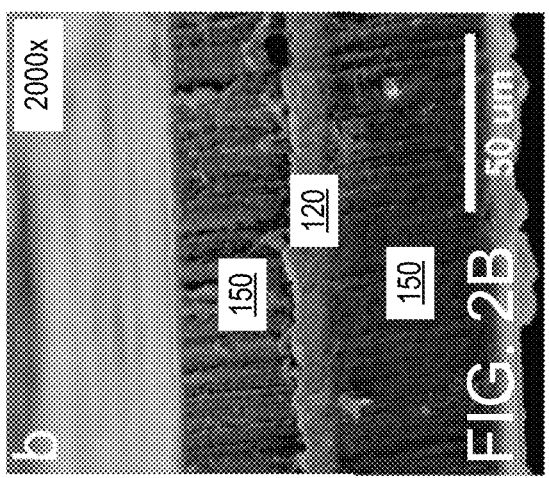
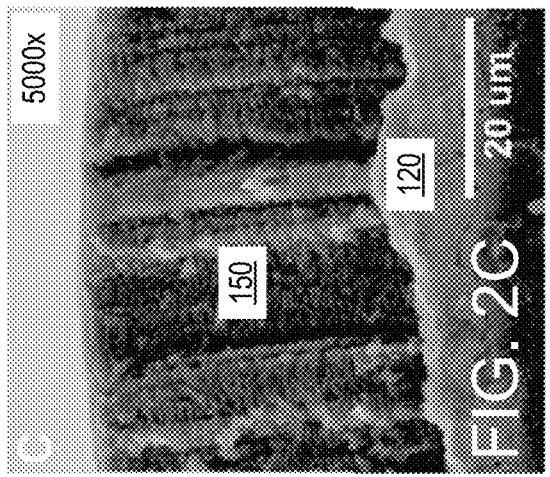
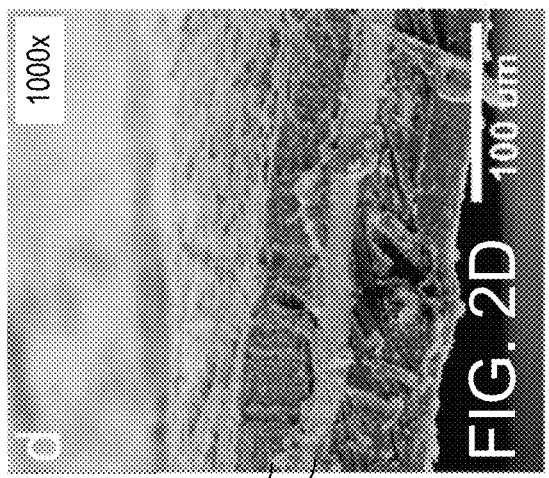
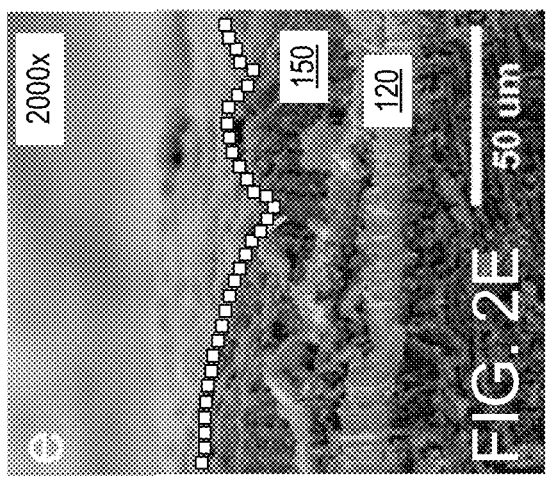
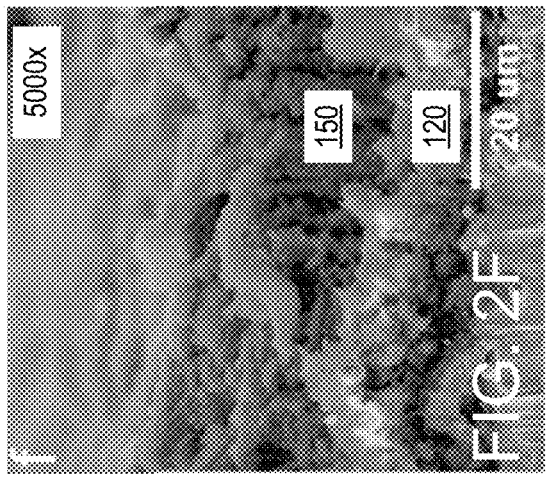

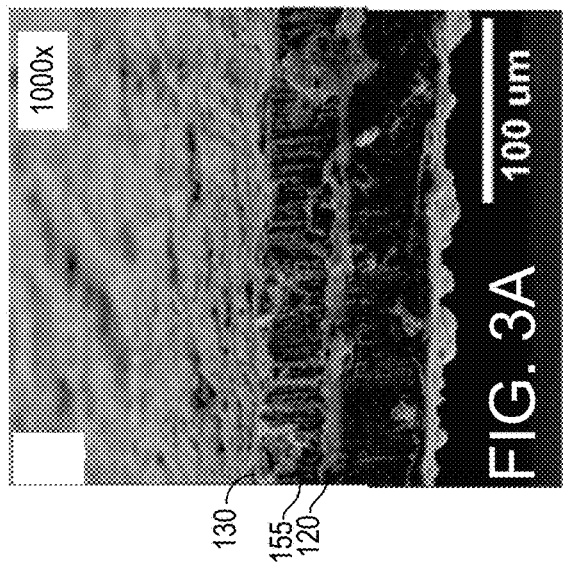
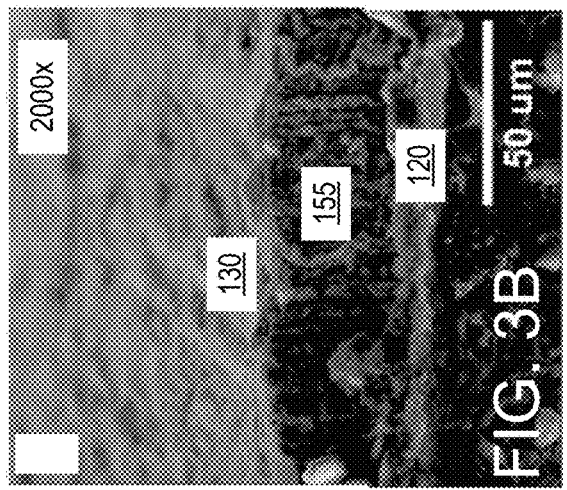
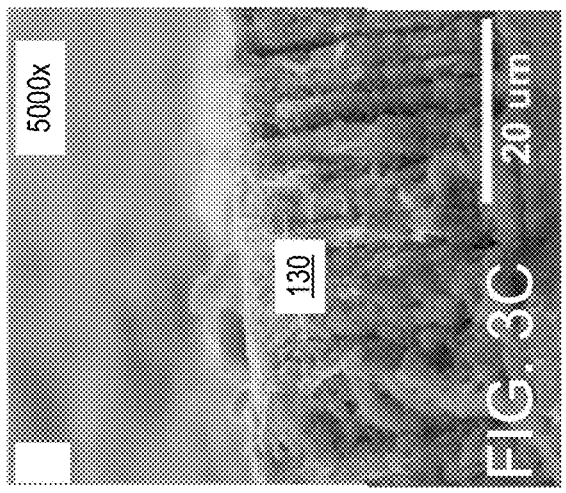
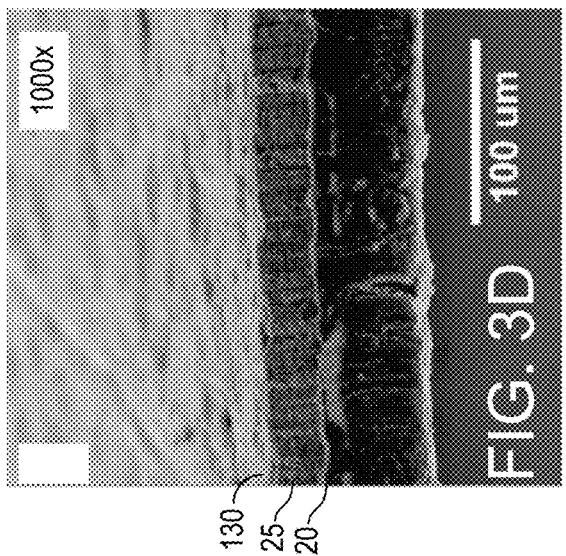
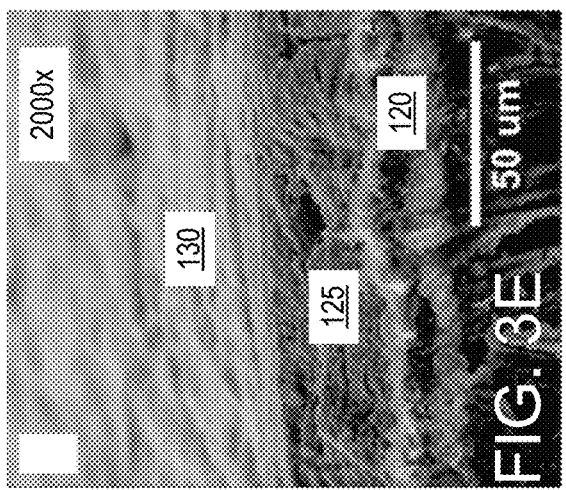
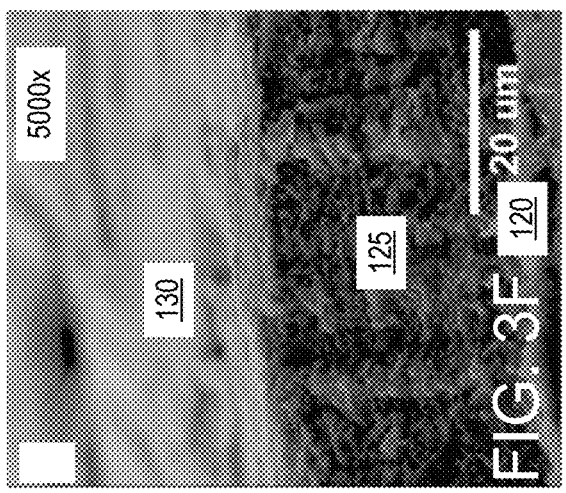

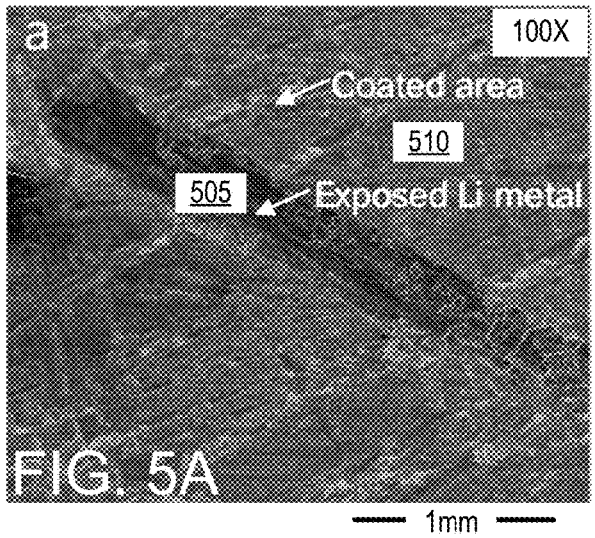
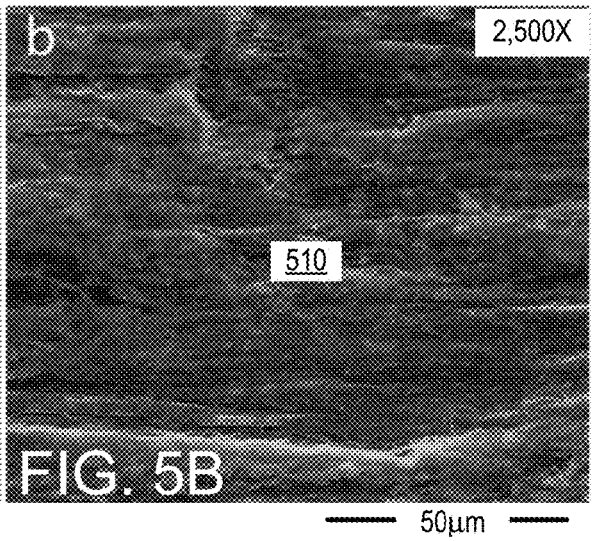
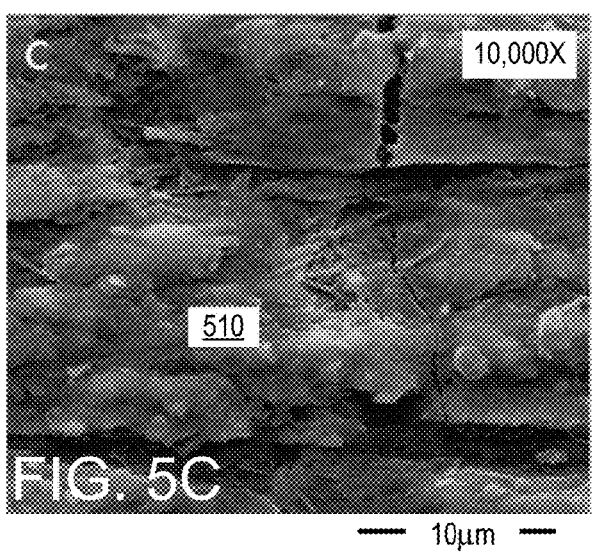
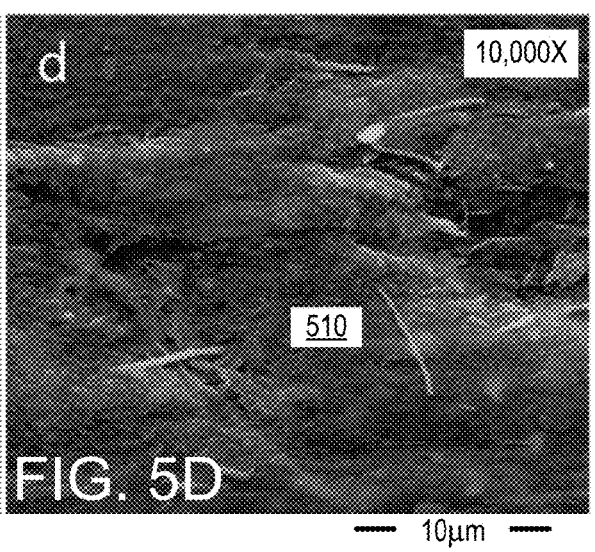

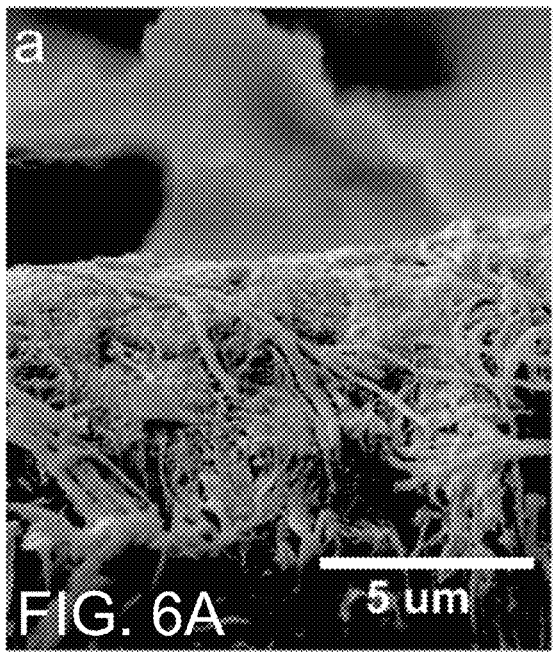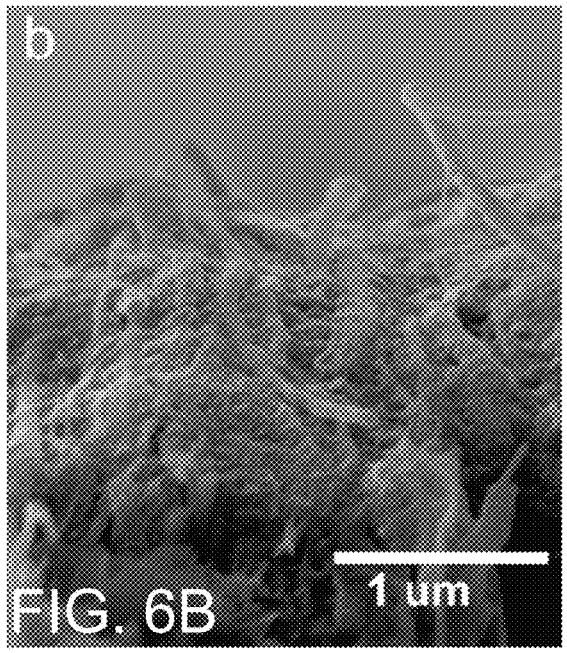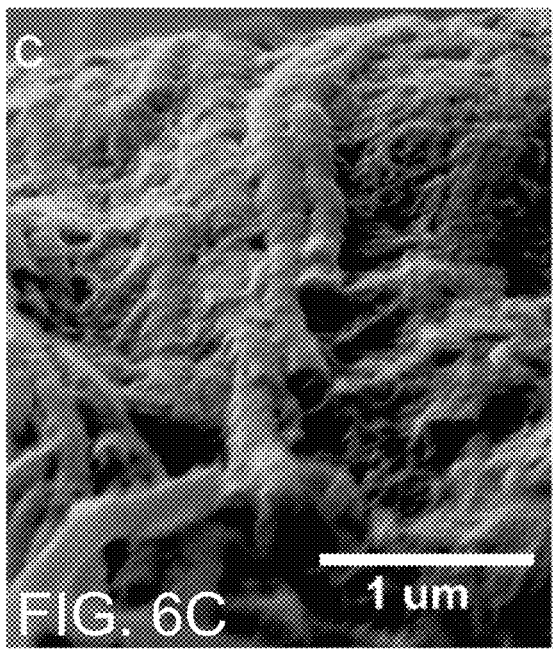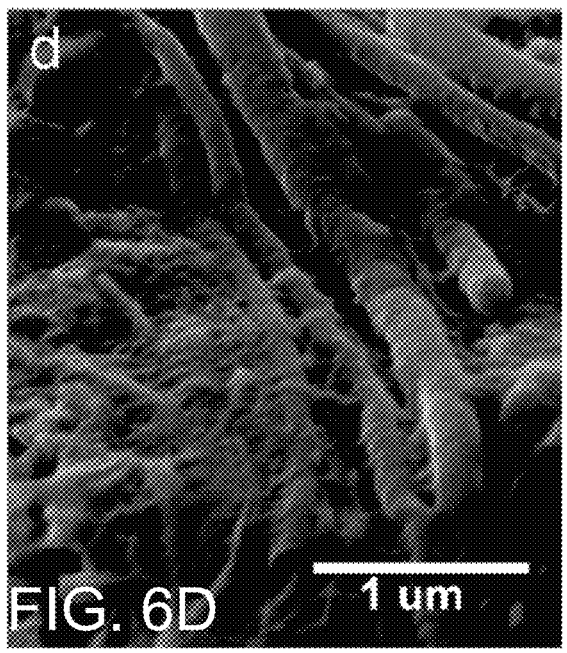

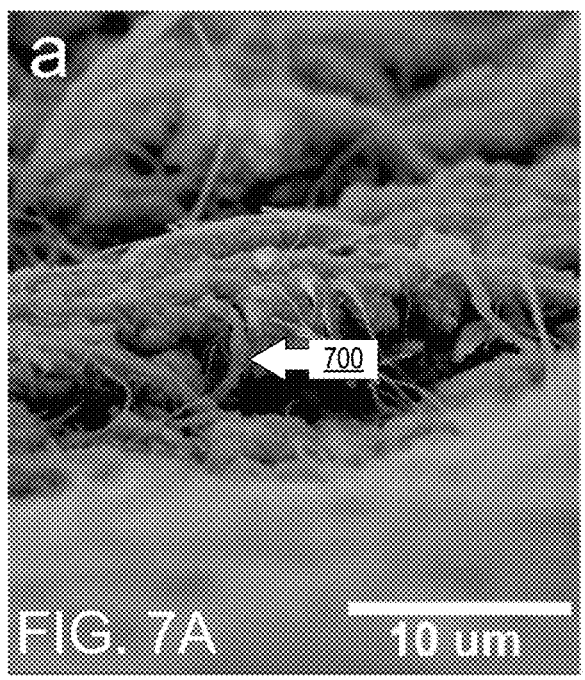
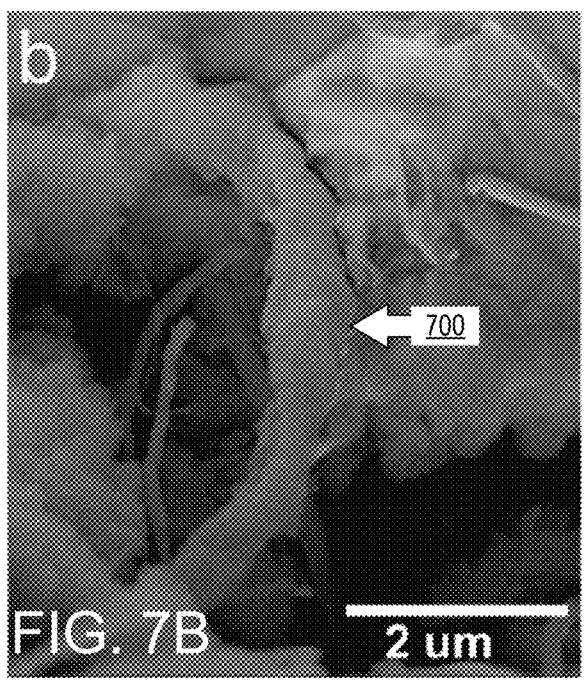

ALKALI-METAL ANODE WITH ALLOY COATING APPLIED BY FRICTION

CROSS-REFERENCE TO RELATED PATENT APPLICATIONS

This application claims priority to U.S. Patent Appl. Ser. No. 62/909,062, filed Oct. 1, 2019, entitled "Alkali-Metal Anode With Alloy Coating Applied By Friction," which patent application is commonly owned by the owner of the present invention. This patent application is incorporated herein in its entirety.

GOVERNMENT INTEREST

This invention was made with government support under Grant No. FA9550-14-1-0111, awarded by the United States Department of Defense/Air Force Office of Scientific Research. The United States government has certain rights in the invention.

TECHNICAL FIELD

The present invention relates to an alkali-metal (such as lithium-metal) anode that suppresses dendrite formation and a process for making same.

BACKGROUND

An electric battery includes one or more electric cell. Each cell includes a positive terminal (cathode) and a negative terminal (anode) physically separated by an ion conductor (electrolyte). When a cell is discharged to power an external circuit, the anode supplies negative charge carriers (electrons) to the cathode via the external circuit and positive charge carriers (cations) to the cathode via the internal electrolyte. During charging, an external power source drives electrons from the cathode to the anode via the power source and the resultant charge imbalance pulls cations from the cathode to the anode via the electrolyte.

Lithium-ion (Li-ion) batteries store charge in the anode as Li cations (aka Li ions), which are the positive charge carriers that travel to and are stored in the cathode during discharge. Li-ion batteries are rechargeable and ubiquitous in mobile communications devices and electric vehicles due to their high energy density, a lack of memory effect, and low self-discharge rate.

Lithium-metal batteries store charge in the anode as lithium metal. As with lithium-ion batteries, lithium ions are the positive charge carriers that travel to and are stored in the cathode during discharge. Li-metal batteries retain charge for a long time and have superior power density. Applications include implantable medical devices, watches, and calculators. Li-metal batteries are generally not rechargeable, largely because dendrites—whiskers of conductive lithium—can form within the battery during recharge and short the anode to the cathode. Resultant rapid discharge though the cell can overheat the battery, causing rupture and even explosion. There is a strong demand for rechargeable batteries with the power density available from Li-metal batteries that could be met if dendrite formation could be suppressed.

SUMMARY OF THE INVENTION

In general, in one embodiment, the invention features a method of fabricating an anode having a coating on a surface of an alkali metal. The method includes texturizing the surface of the alkali metal. The method further includes smoothing the texturized surface of the alkali metal by a process that includes (i) applying a material under pressure to the texturized surface of the alkali metal, and (ii) moving the applied material relative to the texturized surface of the alkali metal under pressure to produce a friction. The friction alloys the material with the alkali metal to produce the coating on the surface of the alkali metal.

Implementations of the invention can include one or more of the following features:

The method can further include repeating the texturizing and the smoothing.

The smoothing can thicken the coating.

The material can consist essentially of particles.

The particles can be grouped as a bulk solid.

The material can include at least one form of carbon nanomaterial.

The material can consist primarily of the at least one form of carbon nanomaterial.

The at least one form of carbon nanomaterial can be selected from a group consisting of multi-walled carbon nanotubes, single-walled carbon nanotubes, few-walled carbon nanotubes, graphene nanoribbons, graphene oxide nanoribbons, graphoil, graphene nanoplatelets, graphene, and mixtures thereof.

The material can include phosphorus.

The material can include sulfur.

The material can consist primarily of phosphorus pentasulfide.

The texturizing can include applying an abrasive under pressure to the surface of the alkali metal and moving the applied abrasive relative to the surface of the alkali metal.

The abrasive can include granules.

The coating can consist primarily of ions of the alkali metal and at least one form of carbon nanomaterial.

In general, in another embodiment, the invention features an electrochemical cell that includes a cathode, an electrolyte adjacent the cathode, and an anode adjacent the electrolyte opposite the cathode. The anode includes an alkali-metal layer to source alkali-metal ions to the electrolyte. The anode further includes a coating between the alkali-metal layer and the electrolyte. The coating includes an agglomerate of disordered nanomaterial saturated with the alkali-metal ions.

Implementations of the invention can include one or more of the following features:

The coating can include particles derived from a material. The particles can be randomly distributed over the alkali-metal layer and saturated with the alkali-metal ions using a process of (i) texturizing a surface of the alkali-metal layer, (ii) applying the material under pressure to the texturized surface of the alkali-metal layer, and (iii) moving the applied material relative to the texturized surface of the alkali-metal layer under pressure to produce a friction. The friction can alloy the material with alkali metal of the alkali-metal layer to produce the coating.

The coating can include physically altered particles derived from the material.

The randomly distributed particles derived from the material can consist predominantly of the alkali-metal ions and carbon.

The randomly distributed particles derived from the material can consist predominantly of the alkali-metal ions, phosphorus, and sulfur.

The electrochemical cell can further include a current collector physically and electrically contacting the alkali-metal layer.

BRIEF DESCRIPTION OF THE DRAWINGS

FIGS. 2A-2C are scanning electron micrographs (SEM) images of a substrate coated on both sides with a lithium layer, which SEM images are at different magnifications.

FIGS. 2D-2F are SEM images of a substrate bearing a texturized lithium layer, which SEM images are at different magnifications.

FIGS. 3A-3C are SEM images of a substrate bearing texturized lithium layer(s) and an incomplete version of a coating, which SEM images are at different magnifications.

FIGS. 3D-3F are SEM images of a substrate bearing texturized lithium layer(s) after consecutive cycles of abrasion and powder spreading, which SEM images are at different magnifications.

FIG. 5A is an SEM image of an MWCNT-coated Li metal foil produced by a method detailed in connection with FIG. 1B in which a coating over lithium metal was produced by repeating the abrasion and MWCNT powder spreading processes five times.

FIGS. 5B-5D higher magnification SEM images of the MWCNT-coating shown in FIG. 5A.

FIGS. 6A-6D depict cross-sectional SEM images after an initial spreading of MWCNT powder over a textured lithium surface.

FIGS. 7A-7B are SEM images showing cross sections of the interior of an MWCNT-based coating, applied by the abrasion method detailed in connection with FIG. 1B.

DETAILED DESCRIPTION

Figure 1A:
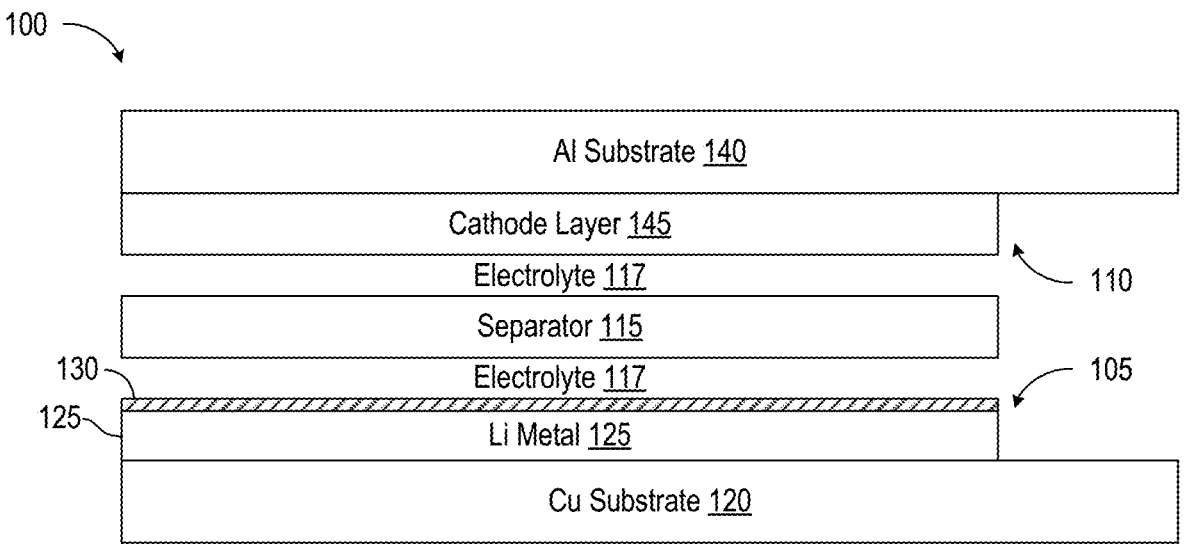
FIG. 1A depicts an electrochemical cell with a lithium-metal anode.

FIG. 1A depicts an electrochemical cell 100 with a lithium-metal anode 105 that suppresses dendrite formation and can be fabricated using a simple, inexpensive, and solvent-free process. As is typical of lithium-metal cells, cell 100 also includes a cathode 110 separated from anode 105 via a separator 115 of, e.g., a porous polymer and an electrolyte 117.

Anode 105 includes a copper substrate 120 that serves as current collector and provides physical support for a layer of lithium metal 125 that sources alkali-metal ions to cathode 110 via electrolyte 117 and separator 115. (Separator 115 is saturated with electrolyte 117 but the two are shown separately for ease of illustration.) A thin-film coating 130 includes an agglomerate of disordered nanomaterial saturated with the alkali-metal ions. Coating 130 suppresses dendrite formation and can be applied simply using a dry, abrasive technique. Cathode 110 includes an aluminum substrate 140 that serves as current collector and provides physical support for an active cathode layer 145. An embodiment of cathode 110 is detailed in Ser. No. 17/009,530, entitled "Sulfurized Carbon Cathodes," filed Sep. 1, 2020, by Tour et al. (the "Tour '530 Patent Application"), which claims priority to U.S. Patent Application Nos. 62/905,125 and 62/905,535, filed Sep. 24, 2019, and Sep. 25, 2019, respectively. The Tour '530 Patent Application is incorporated herein by reference. This writing takes precedence over incorporated material, including Tour '530 Patent Application, for purposes of claim construction.

Figure 1B:
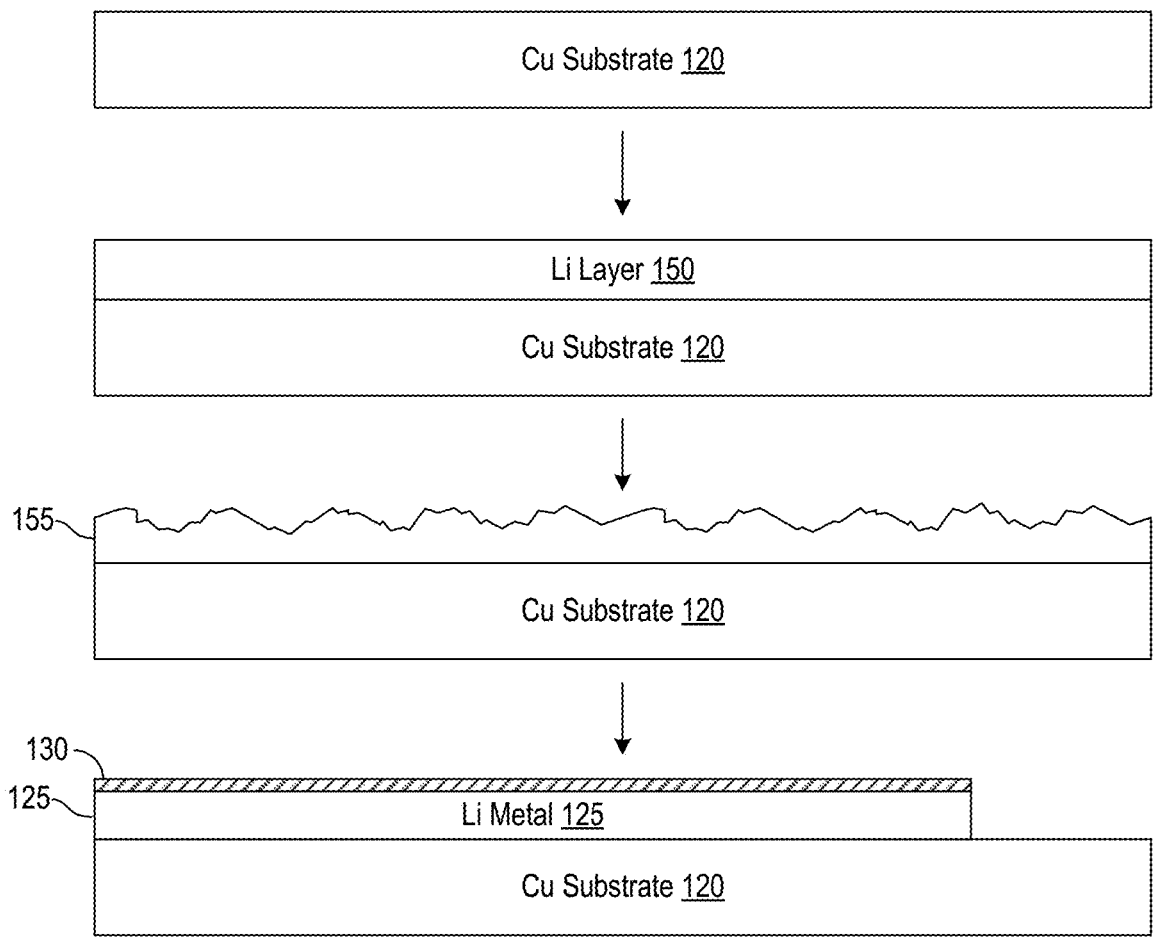
FIG. 1B depicts a method of fabricating the anode shown in FIG. 1 in accordance with an embodiment of the present invention.

FIG. 1B illustrates a method of fabricating anode 105 of FIG. 1A in accordance with one embodiment. Substrate 120, e.g., a sheet of copper foil 8 µm thick, is coated with, e.g., 40 µm of lithium to form a lithium layer 150. A second lithium layer 150 is formed on the other side of substrate 120 but is omitted in this illustration. FIGS. 2A-2C are scanning electron micrographs (SEMs) of substrate 120 coated on both sides with a lithium layer 150 at, respectively, 1,000×, 2,000×, and 5,000× magnifications. The visible edge was cut with scissors. The copper foil of substrate 120 is slightly deformed due to the cutting. The visible surface of the top lithium layer 150 is smooth with no callosities.

Returning to FIG. 1B, the top surface of lithium layer 150 is texturized by abrasion using, e.g., sandpaper to form a texturized lithium layer 155. FIGS. 2D-2F are SEMs of substrate 120 bearing texturized lithium layer(s) 155 at, respectively, 1,000×, 2,000×, and 5,000× magnifications. The sandpaper was applied by hand using straight movements over the metal surface to produce lines that parallel the reader's view. The abrasion was performed before the material was cut with scissors to expose the imaged edge.

Returning again to FIG. 1B, a polishing powder of M-grade multi-wall carbon nanotubes (MWCNTs) was spread over the texturized surface of layer 155 by hand. Moving the applied material relative to the texturized surface of lithium metal layer 155 under pressure produces a friction that alloys material of the polishing powder with the lithium to produce coating 130. The abrading and polishing steps can be repeated with the same or different abrasives and powders to build coating 130 to a desired thickness. Rubbing with the powder smooths the surface of lithium metal layer 125 and fixes the MWCNTs to that surface as a solid layer (e.g., a bulk solid, an assembly of particles for which the statistical mean of any property is independent of the number of particles).

FIGS. 3A-3C are SEMs of substrate 120 bearing texturized lithium layer(s) 155 and an incomplete version of coating 130 at, respectively, 1,000×, 2,000×, and 5,000× magnifications. Lithium is a soft metal and the pressure applied in distributing the MWCNTs may cause the metal to spread into a flat, and possibly thinner, layer.

FIGS. 3D-3F are SEMs of substrate 120 bearing texturized lithium layer(s) 155 after consecutive cycles of abrasion and powder spreading as detailed previously. The upper surfaces of lithium layer 125 and coating 130 appear relatively smooth, with repeated smoothing from the spreading of the powder thickening coating 130.

Both the texturing and material-application processes can be automated for mass production. These processes do not require drying, and can thus be performed quickly and without the areal requirements of wet processes. Unconsumed feed materials, MWCNT powder for example, can be reapplied to minimized waste.

The material used to polish and alloy with layer 125 is not limited to MWCNTs. Other forms of carbon might also be used, such as single-walled carbon nanotubes, few-walled carbon nanotubes, graphene nanoribbons, graphene oxide nanoribbons, graphoil, graphene nanoplatelets, and mixtures thereof. Nor is carbon a prerequisite. For example, some embodiments employ phosphorus pentasulfide ($P_4S_{10}$), molybdenum disulfide ($MoS_2$), or both with or in lieu of carbon-based materials. Other materials for use in coating the lithium metal include polyaniline, sulfurized carbon, polytetrafluoroethylene, and polyvinylidene difluoride. Graphene nanomaterials, such as nanoplatelets, can be added to produce more even distribution of the powder materials over the surface of Li metal.

Figure 4:
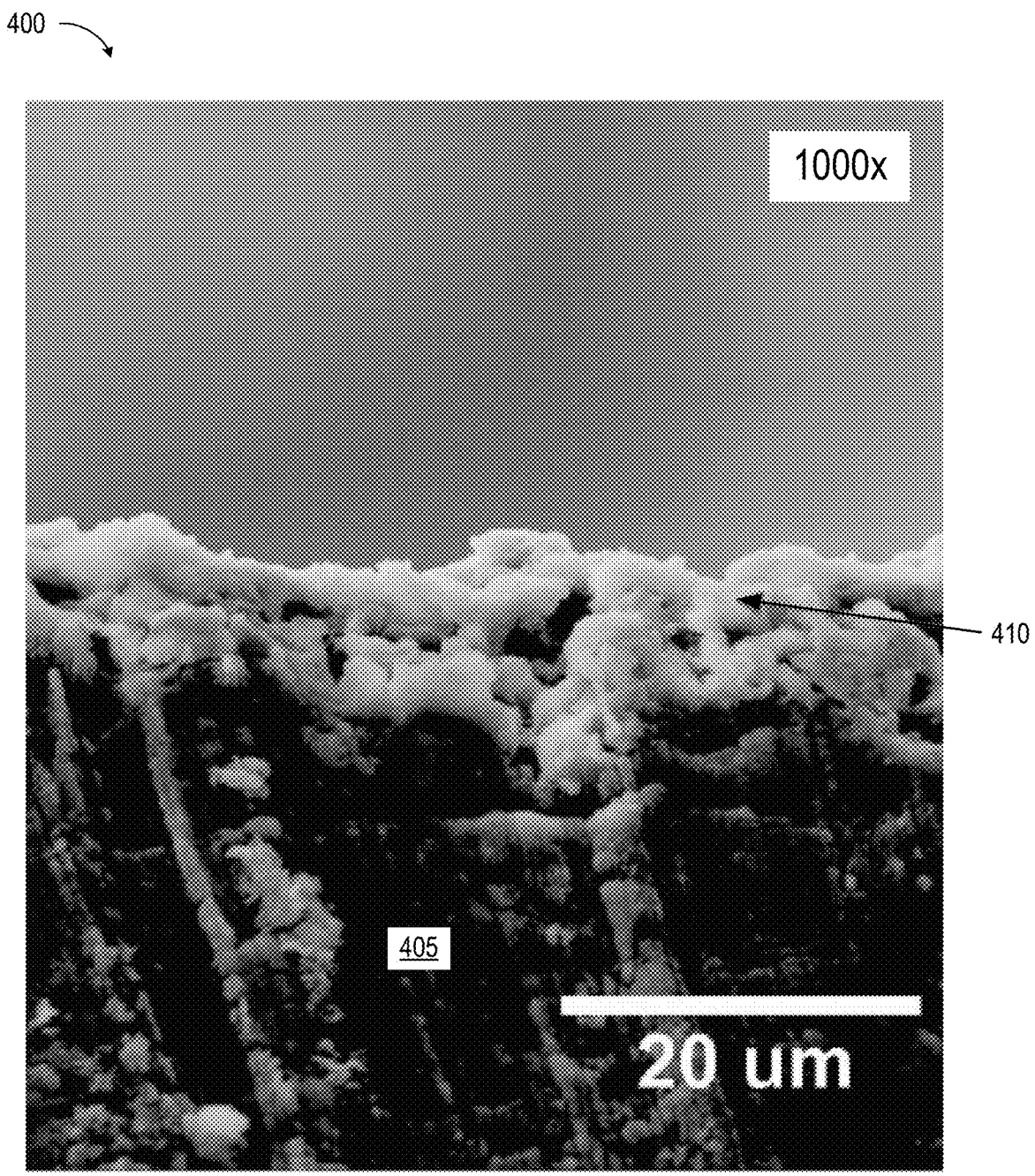
FIG. 4 is an SEM image showing a cross section of a lithium layer bearing a coating formed by application of phosphorus pentasulfide particles using the method detailed in connection with FIG. 1B.

FIG. 4 is a SEM 400 showing a cross section, at 1,000× magnification, of a lithium layer 405 bearing a coating 410 formed by application of phosphorus pentasulfide particles using the method detailed above in connection with FIG. 1B.

FIG. 5A is a SEM of an MWCNT-coated Li metal foil produced by a method of the type disclosed above in connection with FIG. 1B in which a coating over lithium metal was produced by repeating the abrasion and MWCNT powder spreading processes five times. FIGS. 5B-5D are higher-magnification SEMs of the MWCNT coating.

Though not evident in these black-and-white micrographs, MWCNT coatings produced by the abrasion method can have a reddish/purple hue. A scratch 505 exposing bare lithium-metal was purposefully drawn by a tweezer tip to highlight the coating 510. Coating 510 is an agglomerate of disordered nanomaterial saturated with lithium-metal ions. In an assembled cell, coating 510 separates the lithium metal from the electrolyte and suppresses the formation of dendrites. The surface of coating 510 appears homogenous and few tubular structures (MWCNTs) are seen distributed and intertwined inside the coating. Surface MWCNTs in FIGS. 5C-5D appear to be merged with coating 510.

FIGS. 6A-6D show cross-sectional SEMS after an initial spreading of MWCNT powder over a textured lithium surface. At relatively low magnification (FIG. 6A) one can see MWCNTs filling the gaps on top of the Li metal. At higher magnification (FIGS. 6B-6D), tubular structures look damaged at external walls and merged with a material distributed along the surface. In some cases, individual carbon nanotubes (FIGS. 6B-6C) merge into a monolithic structure where it is not easy to distinguish each tube. This initial morphology is what could later (after successive abrasive/spreading cycles) turn into the coating observed in FIGS. 5A-5D.

FIGS. 7A-7B are SEMs showing cross sections of the interior of an MWCNT-based coating, applied by the abrasion method of FIG. 1B, in which a tubular structure 700 is seen merging into a bigger monolithic structure, the alloyed coating like coating 130 of FIG. 1A. Structure 700 is evidently a deformed and lithiated carbon nanotube with an irregular surface. Typically, surfaces of MWCNT are seen in SEMs to be smooth and clean. Based on information and belief, the physical deformation of the MWCNT results from the uptake of Li ions and the mechanical damage imposed by the abrasion action.

Figure 8:
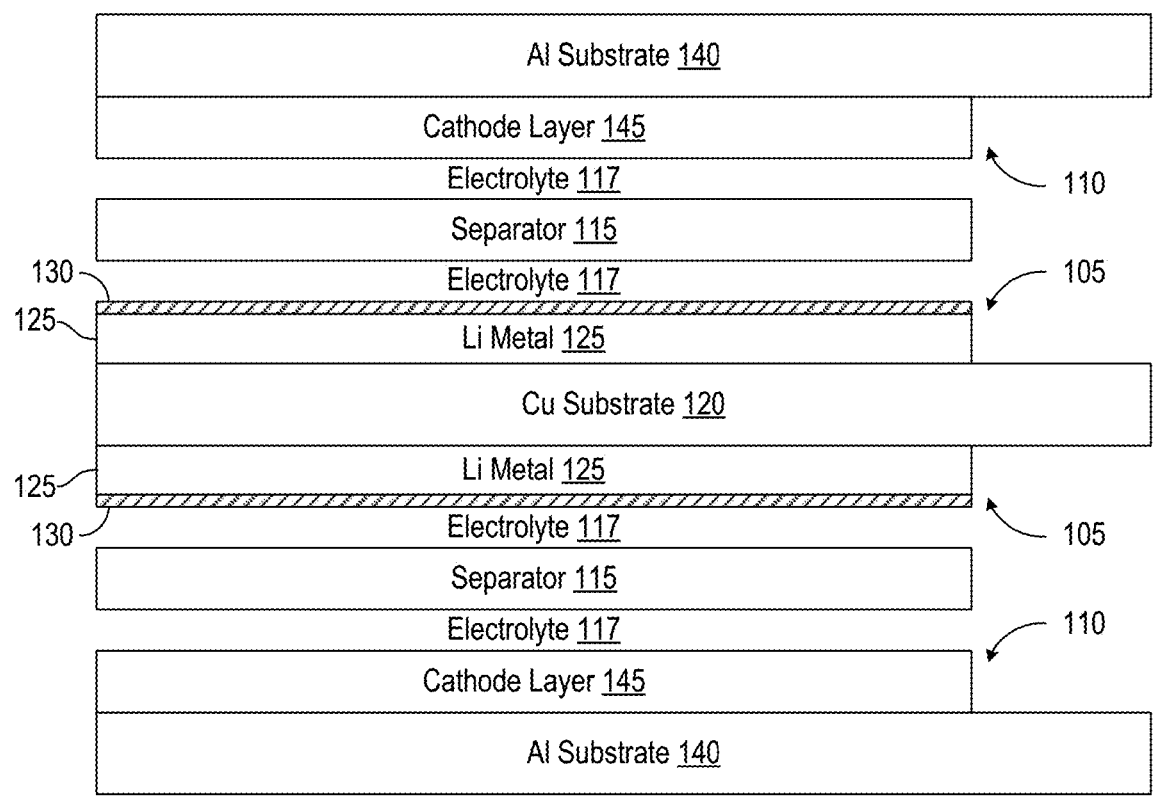
FIG. 8 depicts an electrochemical cell having a two-sided variant of battery shown in FIG. 1A.

FIG. 8 depicts an electrochemical cell 800, a two-sided variant of cell 100 of FIG. 1A with like-identified elements being the same or similar.

The foregoing discussion focuses on batteries that employ lithium ions as charge carriers. Other alkali metals (e.g., sodium and potassium) and alkali earth metals (e.g., magnesium) can also be used.

Further forms of carbon materials that can be used in addition or alternative to multi-walled carbon nanotubes (and single-walled carbon nanotubes, few-walled carbon nanotubes, graphene nanoribbons, graphene oxide nanoribbons, graphoil, graphene nanoplatelets, and mixtures thereof) include doped MWCNT, reduced graphene oxide, graphene, and mixtures thereof.

Additional variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described. The symbol "~" is the same as "approximately".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in this specification are approximations that can vary depending upon the desired properties sought to be obtained by the presently disclosed subject matter.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A method of fabricating an anode having a coating on a surface of an alkali metal, the method comprising:
   (a) texturizing the surface of the alkali metal; and
   (b) smoothing the texturized surface of the alkali metal by a process comprising
      (i) applying a material under pressure to the texturized surface of the alkali metal, and
      (ii) moving the applied material relative to the texturized surface of the alkali metal under pressure to produce a friction, wherein the friction alloys the material with the alkali metal to produce the coating on the surface of the alkali metal.

2. The method of claim 1 further comprising repeating the texturizing and the smoothing.

3. The method of claim 2, wherein the smoothing thickens the coating.

4. The method of claim 1, wherein the material consists essentially of particles.

5. The method of claim 4, wherein the particles are grouped as a bulk solid.

6. The method of claim 1, wherein the material comprises at least one form of carbon nanomaterial.

7. The method of claim 6, wherein the material consists primarily of the at least one form of carbon nanomaterial.

8. The method of claim 7, wherein the at least one form of carbon nanomaterial is selected from a group consisting of multi-walled carbon nanotubes, single-walled carbon nanotubes, few-walled carbon nanotubes, graphene nanoribbons, graphene oxide nanoribbons, graphoil, graphene nanoplatelets, graphene, and mixtures thereof.

9. The method of claim 1, wherein the material comprises phosphorus.

10. The method of claim 1, wherein the material comprises sulfur.

11. The method of claim 10, wherein the material consists primarily of phosphorus pentasulfide.

12. The method of claim 1, wherein the texturizing comprises applying an abrasive under pressure to the surface of the alkali metal and moving the applied abrasive relative to the surface of the alkali metal.

13. The method of claim 12, wherein the abrasive comprises granules.

14. The method of claim 1, wherein the coating consists primarily of ions of the alkali metal and at least one form of carbon nanomaterial.

15. An electrochemical cell comprising:
   (a) a cathode;
   (b) an electrolyte adjacent the cathode; and
   (c) an anode adjacent the electrolyte opposite the cathode, the anode comprising
      (i) an alkali-metal layer to source alkali-metal ions to the electrolyte, and
      (ii) a coating between the alkali-metal layer and the electrolyte, wherein
         (A) the coating comprises disordered nanomaterial saturated with the alkali-metal ions, and
         (B) the disordered nanomaterial are particles that are randomly distributed over the alkali-metal layer, wherein the randomly distributed particles consist predominantly of the alkali-metal ions and carbon.

16. The electrochemical cell of claim 15, wherein
   (a) the coating comprises the particles derived from a material, and
   (b) the particles are randomly distributed over the alkali-metal layer and saturated with the alkali-metal ions using a process of
      (i) texturizing a surface of the alkali-metal layer,
      (ii) applying the material under pressure to the texturized surface of the alkali-metal layer, and
      (iii) moving the applied material relative to the texturized surface of the alkali-metal layer under pressure to produce a friction, wherein the friction alloys the material with alkali metal of the alkali-metal layer to produce the coating.

17. The electrochemical cell of claim 16, wherein the coating comprises physically altered particles derived from the material.

18. The electrochemical cell of claim 15 further comprising a current collector physically and electrically contacting the alkali-metal layer.

* * * * *